(12) United States Patent  (10) Patent No.: US 8,097,806 B2
Lalancette et al.  (45) Date of Patent: Jan. 17, 2012

(54) CABLE PROTECTOR FOR ELECTRICAL OUTLET BOX

(75) Inventors: Daniel Lalancette, St-Jean-sur Richelieu (CA); Yves Boucher, St-Jean-sur Richelieu (CA); Ian Rubin de la Borbolla, Memphis, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 331 days.

(21) Appl. No.: 12/555,071

(22) Filed: Sep. 8, 2009
(Under 37 CFR 1.47)

(65) Prior Publication Data
US 2010/0065296 A1  Mar. 18, 2010

Related U.S. Application Data

(60) Provisional application No. 61/097,248, filed on Sep. 16, 2008.

(51) Int. Cl.
*H02B 1/30* (2006.01)

(52) U.S. Cl. .............. 174/61; 174/58; 174/64; 439/535; 248/906

(58) Field of Classification Search .............. 174/50, 174/53, 58, 61, 54, 63; 439/535; 248/906; 220/4.02
See application file for complete search history.

(56) References Cited

U.S. PATENT DOCUMENTS

| 2,423,757 | A | 7/1947 | Dedge |
| 4,069,448 | A | 1/1978 | Gernhardt |
| 4,788,383 | A | 11/1988 | Caison |
| RE33,147 | E | 1/1990 | Reiker |
| 4,954,667 | A | 9/1990 | Jorgensen et al. |
| 5,135,411 | A | 8/1992 | Wiley et al. |
| 5,170,013 | A | 12/1992 | Borsh et al. |
| 5,170,014 | A | 12/1992 | Borsh |
| 5,860,548 | A | 1/1999 | Kerr, Jr. |
| 5,907,124 | A | 5/1999 | Reiker |
| 5,909,006 | A | 6/1999 | Reiker |
| 5,932,844 | A | 8/1999 | MacAller et al. |
| 5,965,845 | A | 10/1999 | Reiker |
| 5,981,874 | A | 11/1999 | Reiker |
| 6,096,974 | A | 8/2000 | Reiker |
| 6,204,450 | B1 | 3/2001 | Reiker |
| 6,207,898 | B1 | 3/2001 | Reiker |
| 6,242,696 | B1 | 6/2001 | Reiker |
| 6,281,439 | B1 | 8/2001 | Reiker |
| 6,303,859 | B1 | 10/2001 | Reiker |
| 6,303,862 | B1 | 10/2001 | Reiker |
| 6,335,486 | B1 | 1/2002 | Reiker |
| 6,423,899 | B1 | 7/2002 | Reiker |
| 6,545,216 | B1 | 4/2003 | Bell et al. |

(Continued)

FOREIGN PATENT DOCUMENTS

CA  2011181  9/1990

(Continued)

*Primary Examiner* — Dhiru R Patel
(74) *Attorney, Agent, or Firm* — Hoffmann & Baron, LLP

(57) ABSTRACT

An electrical outlet box assembly includes an electrical outlet box and a cable protector. The outlet box includes a box interior for accommodating an electrical fixture and an electrical cable terminated to the fixture. The outlet box includes a mounting tab having a threaded aperture therethrough. The mounting screws are insertable through the aperture of the mounting tab. The cable protector is positioned adjacent the mounting tab for separating the mounting screw from the interior of the box for preventing contact between the mounting screw and the cable terminated therein.

9 Claims, 5 Drawing Sheets

U.S. PATENT DOCUMENTS

| | | |
|---|---|---|
| 6,646,201 B1 | 11/2003 | Gretz |
| 6,720,496 B1 | 4/2004 | Weeks |
| 7,148,420 B1 | 12/2006 | Johnson et al. |
| 7,307,214 B1 * | 12/2007 | Gretz ............................. 174/58 |
| 7,402,748 B1 * | 7/2008 | Gretz ............................. 174/58 |
| 7,518,059 B2 * | 4/2009 | Herth ............................. 174/58 |
| 7,531,744 B1 * | 5/2009 | Rohmer .......................... 174/58 |
| 7,582,827 B1 * | 9/2009 | Gretz ............................. 174/50 |
| 7,595,448 B2 * | 9/2009 | Herth ............................. 174/58 |

FOREIGN PATENT DOCUMENTS

GB  2275833  9/1990

\* cited by examiner

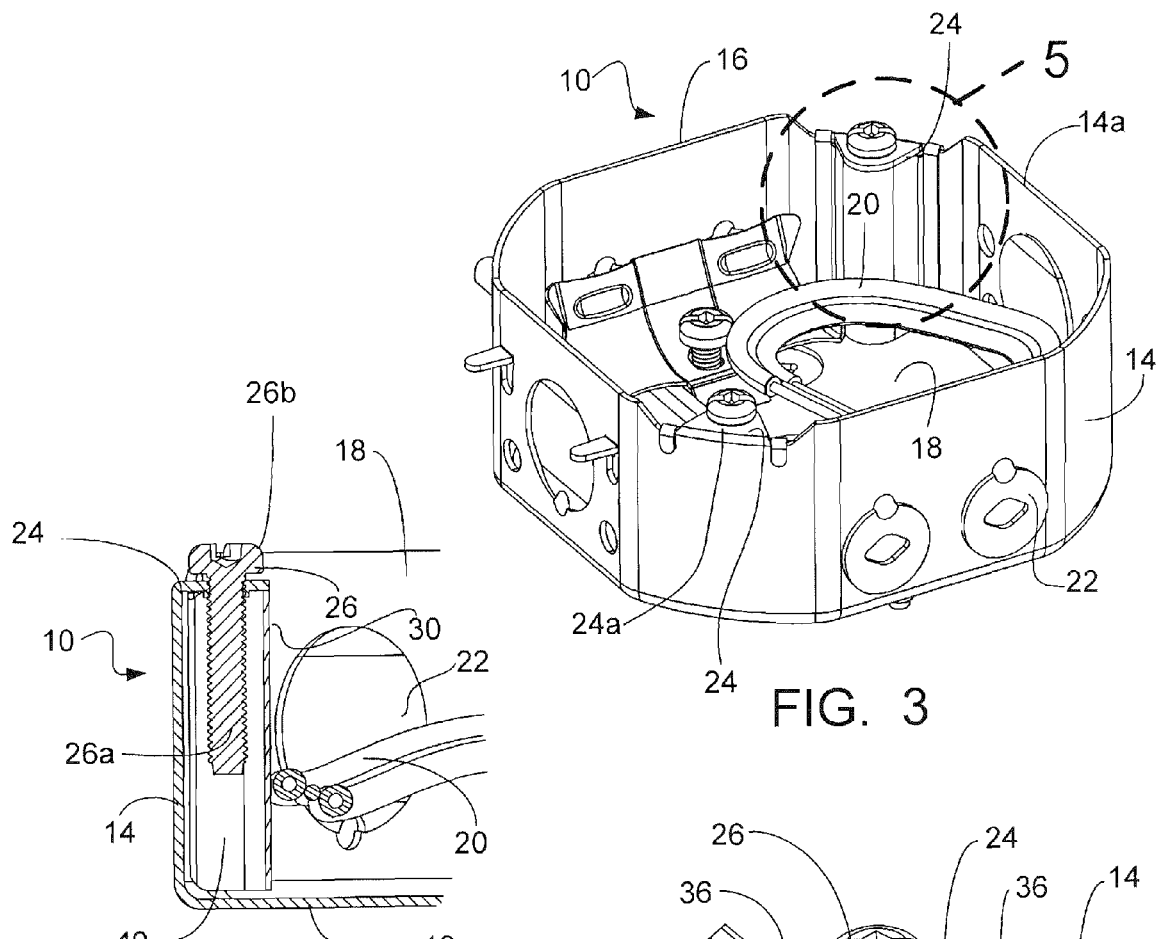
FIG. 3
FIG. 4
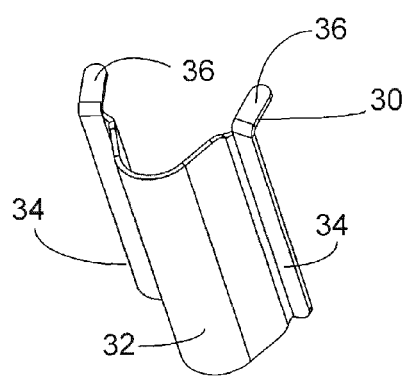
FIG. 6
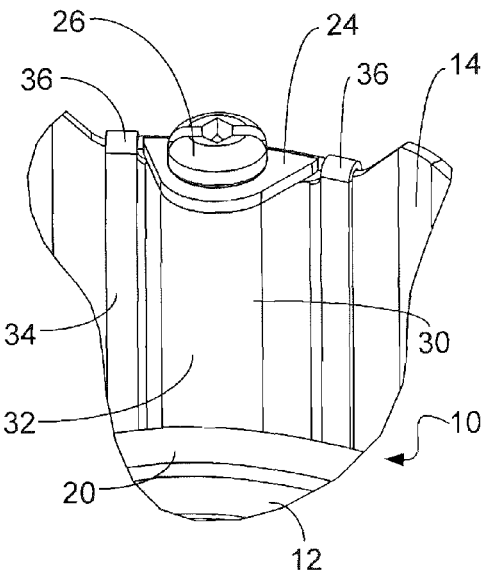
FIG. 5

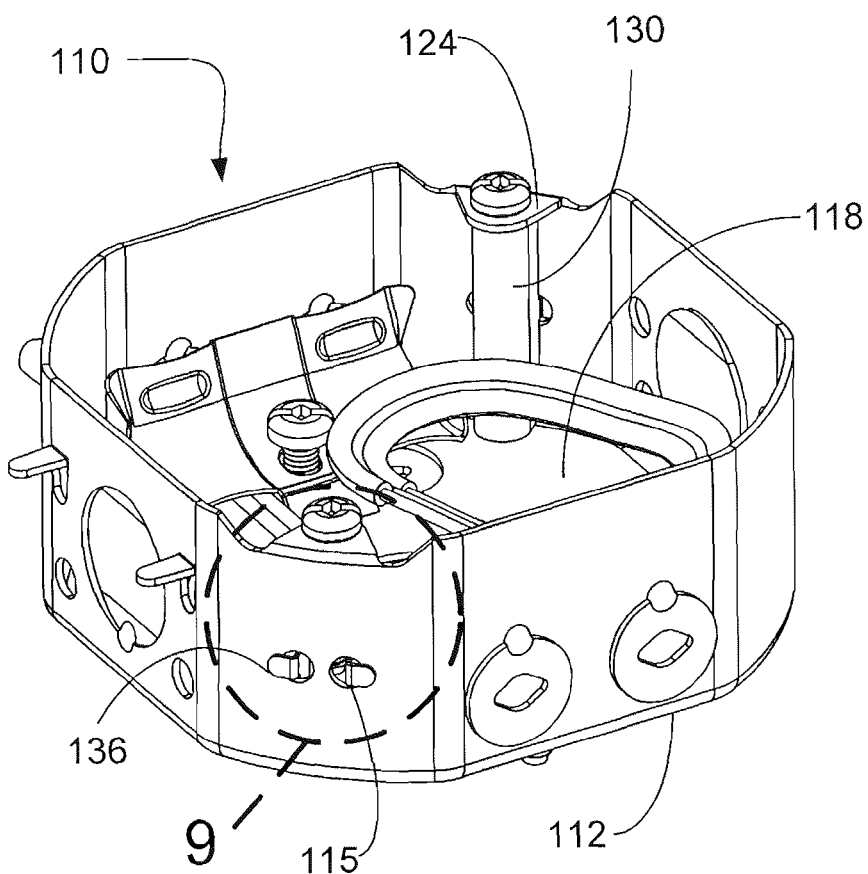
FIG. 7
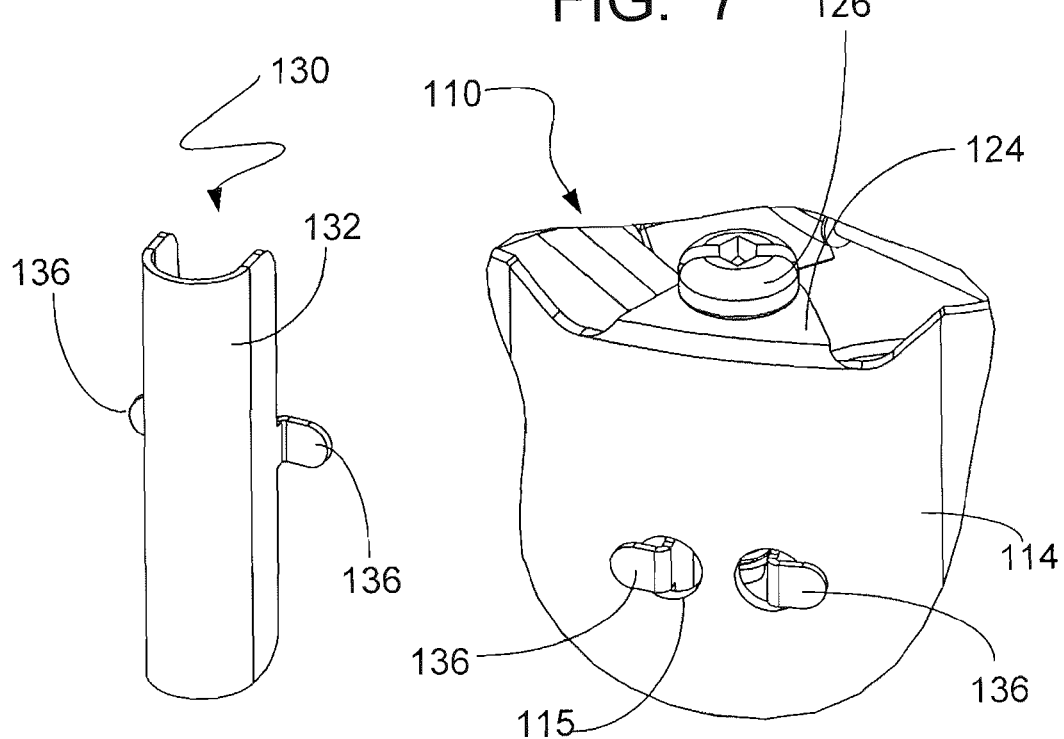
FIG. 8
FIG. 9

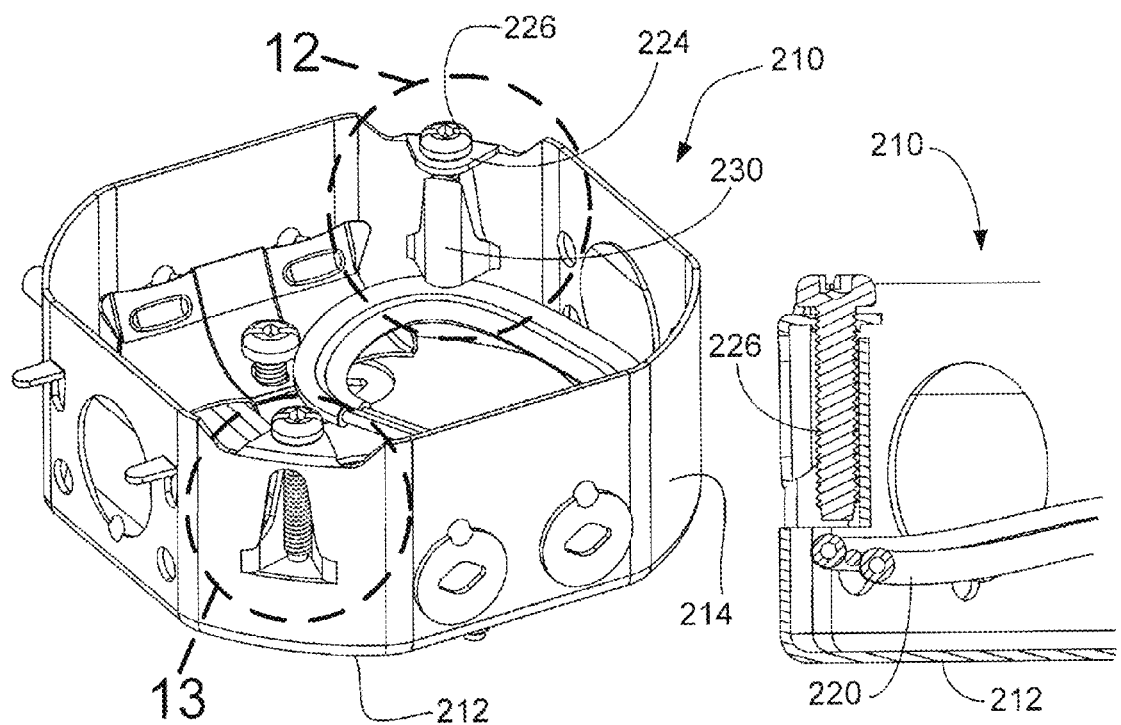
FIG. 10
FIG. 11
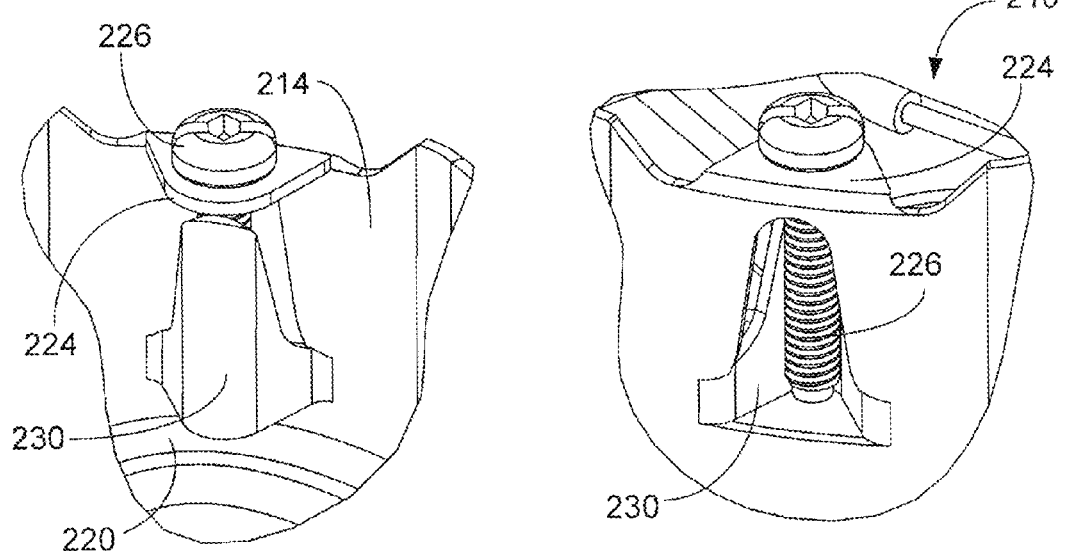
FIG. 12
FIG. 13

CABLE PROTECTOR FOR ELECTRICAL OUTLET BOX

CROSS REFERENCE TO RELATED APPLICATIONS

This application claims priority to U.S. Provisional Patent Application No. 61/097,248 filed on Sep. 16, 2008, the contents of which is incorporated herein by reference in its entirety.

FIELD OF THE INVENTION

The present invention relates generally to an electrical outlet box for terminating electrical wires and cables to fixtures contained within the box. More particularly, the present invention relates to an outlet box having a cable protector so as to protect the electrical wires and cables from contact with mounting screws used to support the fixtures to the box.

BACKGROUND OF THE INVENTION

An electrical outlet box is commonly provided as a termination point for wires and cables carrying electrical current through buildings, houses and other structures. Cables entering an electrical box are typically connected to a particular electrical fixture such as a receptacle or switch. These fixtures may be mounted within the box for termination to an end extent of the cable which is also inserted into the box. The box is then typically covered by a face plate having an opening therein to allow access to the receptacle outlet or the switch while preventing the electrified components from being exposed.

The fixtures and the covers are typically affixed to the outlet box itself by use of mounting screws which may be inserted into tabs having threaded openings therethrough to accommodate the mounting screw. As may be appreciated, the mounting screw extends through the threaded aperture in the tab and into the interior of the outlet box where the electrified components, including the wires and cables, are situated. Depending upon the amount of cables and arrangement of the cables in the outlet box, the cables may come into contact with the mounting screw as it is threadedly inserted through the tab. Since the mounting screws are typically externally threaded metal screws, such contact may tend to abrade the insulation on the cables. Also, as the mounting screw is progressively threaded through the tab, the mounting screw itself may compress the cable against the bottom wall of the outlet box. This could also damage the insulation.

It can be appreciated that damage to the insulation could lead to an undesirable short circuit situation.

It is, therefore, desirable to provide an outlet box which protects the wires and cables contained therein from contact with the mounting screw upon termination of a fixture or cover to the outlet box.

SUMMARY OF THE INVENTION

The present invention provides an electrical outlet box assembly comprising an electrical outlet box having a box interior for accommodating an electrical fixture and cable terminated to the fixture. The outlet box includes a mounting tab having a threaded aperture therethrough. A mounting screw is insertable through the threaded aperture of the mounting tab. A cable protector is provided adjacent the mounting tab for separating the mounting screw from the interior of the box thereby preventing contact between the mounting screw and the cables. Preferably, the outlet box includes a bottom wall, a perimetrical side wall and open upper end. The mounting tab extends inwardly from the side walls adjacent the open upper end. The cable protector extends from adjacent the mounting tab to adjacent the bottom wall.

In one embodiment of the present invention, the cable protector is integrally formed with the side wall of the outlet box and struck inwardly therefrom.

In another embodiment of the present invention, the cable protector is formed as a separate element which is attachable to the outlet box.

In still another embodiment of the present invention, the cable protector may be formed as an indented portion on the side wall.

BRIEF DESCRIPTION OF THE DRAWINGS

FIG. 3 is a perspective showing of the electrical outlet box assembly of the present invention.

FIG. 4 is a partial sectional showing of the outlet box of FIG. 3.

FIG. 5 is a partial perspective view of the outlet box of FIG. 3.

FIG. 6 is a perspective showing of the cable protector used in the outlet box assembly of FIG. 3.

FIG. 7 is a perspective showing a further embodiment of the outlet box assembly of the present invention.

FIG. 8 shows an alternate embodiment of the cable protector of the outlet box assembly of the present invention.

FIG. 9 is a partial perspective view of the attachment of the cable protector of FIG. 8 to the electrical outlet box.

FIG. 10 is a perspective showing of a still further embodiment of the electrical outlet box assembly of the present invention.

FIG. 11 is partial sectional showing of the outlet box of FIG. 10.

FIGS. 12 and 13 are partial perspective views of the interior and exterior of the electrical outlet box of the present invention.

DETAILED DESCRIPTION OF THE PREFERRED EMBODIMENTS

Figure 1:
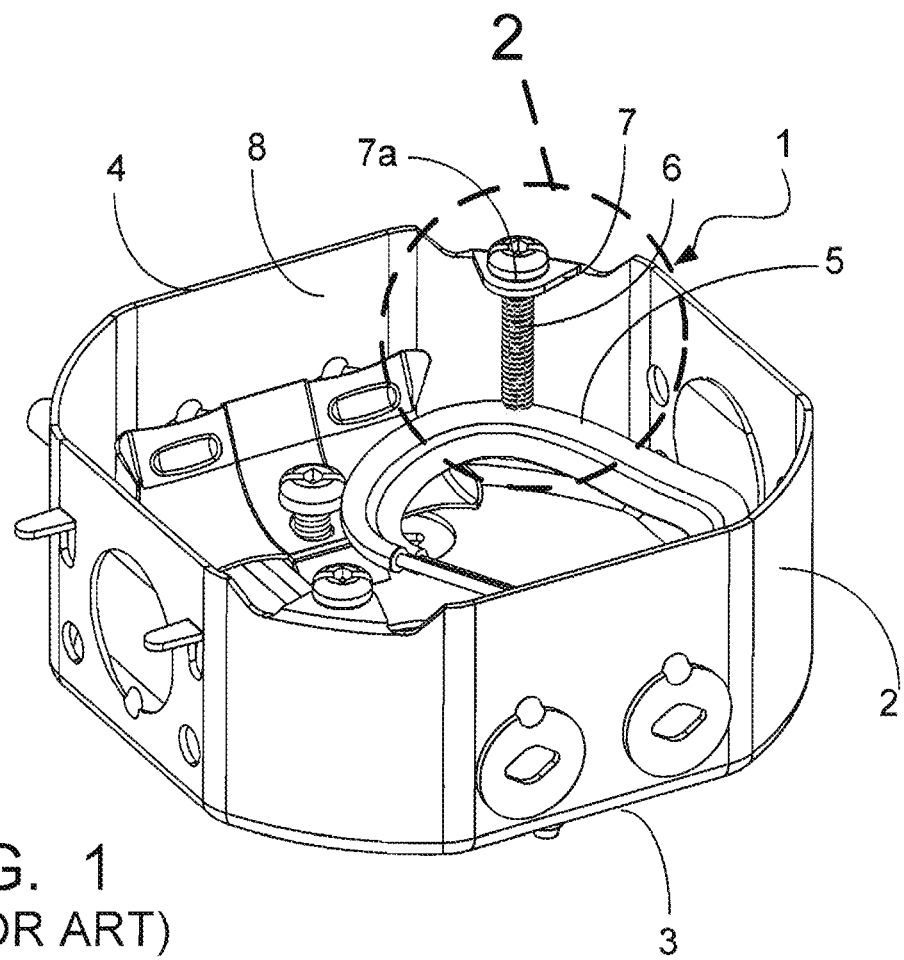
FIG. 1 is a perspective showing of a prior art electrical outlet box.
Figure 2:
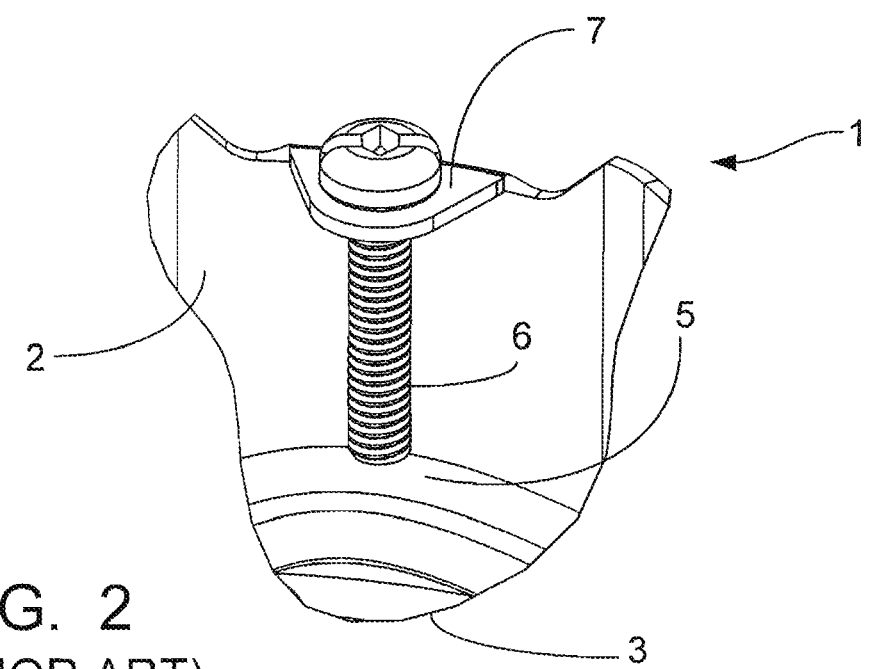
FIG. 2 is an enlarged partial view of the outlet box of FIG. 1.

FIGS. 1 and 2 show an electrical outlet box 1 of the prior art. Electrical outlet box 1 is generally a metallic member having an upstanding perimetrical side wall 2, a bottom wall 3, and an opposed open face 4. In the present illustrative embodiment, the outlet box 1 is an octagonal outlet box, however, other configurations are well known in the art.

The outlet box 1 accommodates a plurality of electrical cables 5 therein which are designed for termination to an electrical fixture (not shown) such as a switch or a receptacle or to ground. As is well known in the art, the electrical fixture may be secured to the outlet box by metallic fasteners 6 such as externally threaded screws which are inserted through inwardly directed tabs 7 having an internally threaded aperture 7a therethrough. Furthermore, other components such as a cover, mud ring and other accessories may also be secured to the box using tabs 7. The tabs 7 may also be used to secure the box to a bracket or other support.

As may be appreciated, threaded insertion of the fastener 6 through the tabs 7 moves the fastener into the interior 8 of outlet box 1. During such insertion, the cable 5 may come in contact with the metallic screw 6, either along the threaded surface thereof or by being compressed against the bottom wall 3 of the outlet box 1 as shown in FIG. 2. Such contact upon threaded insertion of fastener 6 could result in abrasion of the insulation of the cable and thereby cause an undesirable short circuit condition.

As will be set forth hereinbelow, the present invention provides an improved outlet box assembly which prevents contact between the fastener and the cables supported within the box.

Referring to FIGS. 3-6, a first embodiment of the outlet box assembly of the present invention is shown. The present invention provides an electrical outlet box 10 having a bottom wall 12, an upstanding perimetrical side wall 14 extending from the bottom wall, an open upper end 16 opposite bottom wall 12, and a box interior 18. In the present illustrative embodiment, the outlet box 10 is a octagonally shaped outlet box, however, outlet boxes of other configurations are within the contemplation of the present invention.

As is well known in the art, a plurality of electrical cables 20 may be inserted into the outlet box 10 through knockout openings 22 in side wall 14 or bottom wall 12. The cables 20 are designed to be terminated to an electrical fixture (not shown) such as a switch or receptacle which is mounted within outlet box 10. The cable 20 may also be connected to ground.

The outlet box 10 further includes a pair of mounting tabs 24 which extend inwardly from the upper edge 14*a* of side wall 14. The mounting tabs in the present embodiment are located at diagonally opposite locations on side wall 14. The mounting tabs 24 include a threaded aperture 24*a* centrally located therethrough which threadedly accommodates a metallic screw 26 or similar fastener.

The metallic screw 26, more fully shown in FIG. 4, includes an externally threaded shaft 26*a* and a head 26*b* at one end thereof. In conventional fashion, the screw 26 may be threadedly inserted through the aperture 24*a* of mounting tab 24 and may be used to secure the electrical fixture or other device such as a cover plate (not shown) to the outlet box 10. As the screw is insertably threaded through tab 24, the threaded shaft 26*a* is progressed into the interior 18 of outlet box 10.

In order to prevent contact between the threaded shaft 26*a* and cables 20 insertably accommodated within the outlet box 10, the present invention provides a cable protector 30 more fully shown in FIG. 6. The cable protector 30 is an elongate metallic member having a generally U-shaped transverse cross section including a central U-shaped body 32 and a pair of planar wings 34. One end of each wing 34 includes a bendable tab 36 extending upwardly therefrom. The cable protector 30 is insertably positioned at the diagonal locations of the outlet box immediately beneath extending tabs 24. The cable protector 30 is positioned so that the U-shaped member 32 extends inwardly to the interior 18 of box 10. The cable protector 30 thereby defines a channel 40 with side wall 14. The channel 40 provides a space for accommodation of the inserted screw 26 to thereby provide bounded spatial separation between the screw 26 and the remainder of the interior 18 of box 10 containing cables 20. The protector 30 is separately formed and extends from just beneath the tabs 24 to adjacent the bottom wall 12 of box 20 providing complete separation from the interior thereof. This prevents the metallic screw 26 from contacting cables 20 and potentially causing damage thereto. The cable protector 30 may be secured to the side walls of the outlet box using bendable tabs 36 which may be bent about the upper edge 14*a* of side wall 14. The cable protector is positioned such that it preferably is in spacial separation with the screw 26, which is threadedly attached solely to tab 24.

As can be seen with respect to FIG. 4, the cable protector 30 separates screw 26 from cables 20 and prevents contact therebetween upon insertion of the screw 26 into tabs 24.

A further embodiment of the electrical outlet box assembly of the present invention is shown in FIGS. 7-9. This embodiment is substantially similar to the embodiment shown in FIGS. 3-6 and therefore similar reference numerals will be used to denote similar components.

Outlet box 110 includes a bottom wall 112, an upstanding perimetrical side wall 114, and open upper end 116, and a box interior 118. Again, the present embodiment is shown with respect to an octagonal outlet box, however, outlet boxes of other configurations may be employed.

Outlet box 110 further includes a pair of mounting tabs 124 which extend inwardly from an upper edge 114*a* of side wall 114. The mounting tabs 124 include a threaded aperture 124*a* which accommodates a metallic screw 126. The outlet box 110 further insertably accommodates cables 120 in the interior 118 thereof through knockout openings 122.

In order to protect the inserted cables from contact with the metallic screw 126, cable protector 130 is provided. Cable protector 130 is an elongated generally U-shaped member having a pair of oppositely directed centrally located bendable tabs 136 extending therefrom. As with the embodiment described above, the cable protector 130 may be positioned so that the U-shaped portion thereof extends inwardly to the interior of box 112. The extending tabs 136 are insertable through openings 115 in side wall 114 to retain the cable protector 130 thereto. The cable protector defines a channel 140 which provides a clearance space for accommodating the inserted screw 126 to thereby provide bounded spatial separation between the screw 126 and remainder of the interior 118 of box 110. Thus, the protector separates metallic screw 126 from cables 120 thereby avoiding potential damage to the cables from contact therewith.

A still further embodiment of the electrical outlet box assembly of the present invention is shown with respect to FIGS. 10-13. Again, the present embodiment is substantially similar to the embodiments shown and described above and similar reference numerals will be used to denote similar components.

In the previous two embodiments, the cable protector 30, 130 is a separately formed element which is insertably secured to the side wall 14, 114 of outlet box 10, 110 by the use of bendable tabs 36, 136. In the present illustrative embodiment, cable protector 230 is integrally formed with side wall 214.

In the present illustrative embodiment, outlet box 210 includes a bottom wall 212, upstanding side wall 214, open upper end 216 and a box interior 218. The box is substantially similar to the outlet box described above. A cable protector 230 is struck inwardly from a portion of the side wall adjacent the diagonal corners thereof. The struck portion is directly beneath tabs 224. The cable protector 230 is thereby integrally formed with box 210. As with the above embodiment, integrally formed cable protector 230 forms a clearance channel 240 which provides a space for accommodation of the inserted screw 226. This channel 240 provides bounded spatial separation between the screw and the interior 218 of box 210 to protect the cables 220 therein. As shown in FIG. 11, the length of the portion of side wall 214 which is struck therefrom is preferably just less than the fully inserted depth of screw 226 so that upon insertion of screw 226 through tab 224 contact is prevented with cables 220 inserted into box 210.

Figure 14:
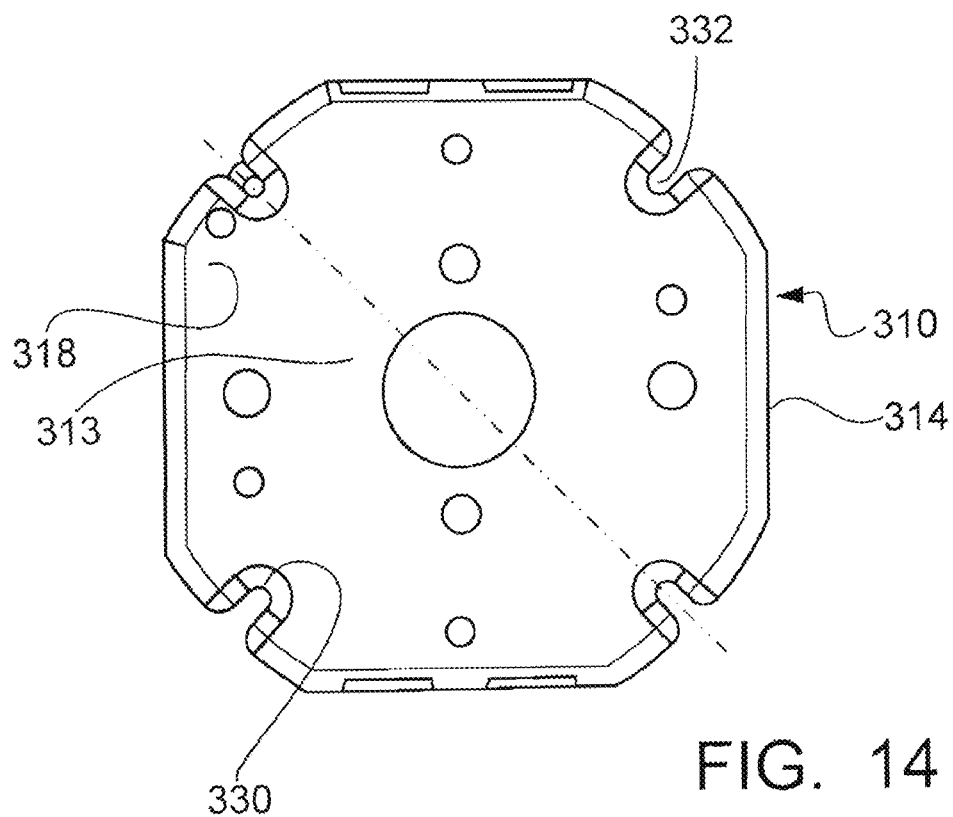
FIGS. 14 and 15 are top planar front perspective views, respectively, of a further embodiment of the electrical outlet box of the present invention.
Figure 15:
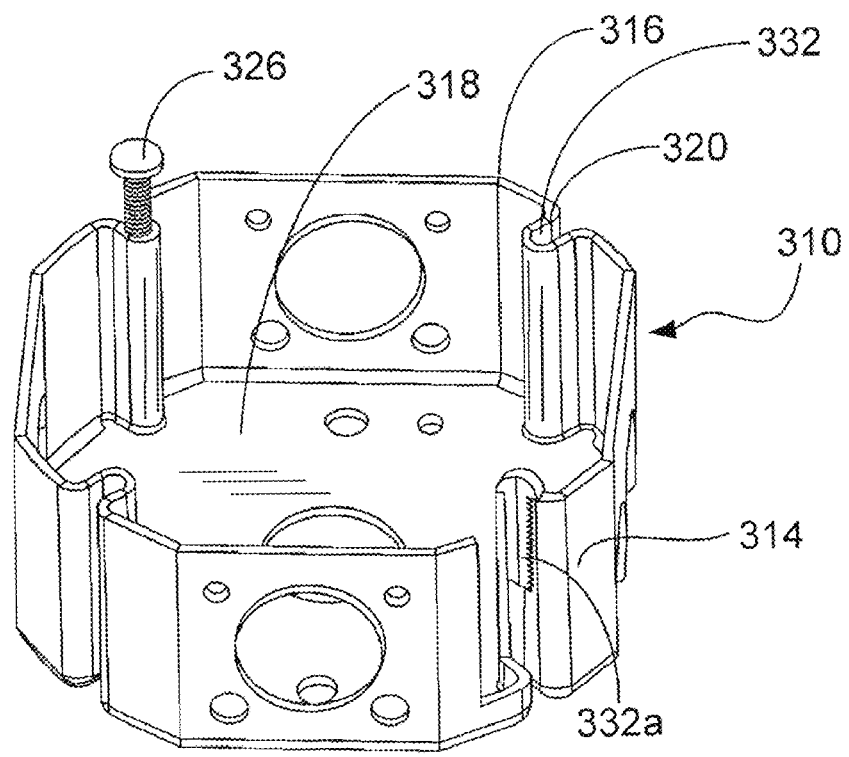

A yet further embodiment of the electrical outlet box assembly of the present invention is shown with respect to FIGS. 14 and 15.

In the present illustrative embodiment, outlet box 310 includes a bottom wall 312, an upstanding side wall 314, an open upper end 316 and a box interior 318. The box 310 is of different construction from the box of the present embodiment in that it does not employ an extending tab for accommodating an inserted screw.

In the present illustrative embodiment, a cable protector 330 is formed integrally with the box. As shown in FIGS. 14 and 15, a cable protector 330 is a generally U-shaped indented portion of the side wall 314 of the box. The indented portion extends from adjacent the bottom wall 312 to the open upper end 316. The indented portion has a generally curved particularly cylindrical cross-sectional shape so as to provide a central elongate cavity 332 for accommodating screw 326. The cavity 332 of cable protector 330 is formed by the exterior surface of side wall 314 which is struck inwardly therefrom. In order to insertably accommodate screw 326, the cavity 332 is internally screw threaded at along at least portion 322a thereof beginning at the upper end to provide for threaded accommodation of screw 326. The present embodiment thus provides a specially formed box which the cavity 332 serves as both the cable protector and the structure which accommodates the screw 326.

In the preferred embodiment shown in FIGS. 14 and 15, four cable protectors 330 are formed at diagonally opposite extents of the octagonal box 312. As shown in FIG. 14, the geometry of the cable protectors 330 may vary to accommodate different screw sizes and configurations. As with the above embodiments, the cable protector 330 provides for separation between the screw 326 and the interior 318 of box 310 to protect the cables supported therein.

Various changes to the foregoing described and shown structures would now be evident to those skilled in the art. Accordingly, the particularly disclosed scope of the invention is set forth in the following claims.

What is claimed is:

1. An electrical outlet box assembly comprising:
an electrical outlet box having a side wall and a box interior for accommodating an electrical fixture and electrical cable terminated to said fixture; said outlet box housing a mounting tab, extending into said box interiorly having a threaded aperture therethrough; a mounting screw insertable through said aperture of said mounting tab;
and a cable protector attachable to said side wall, said cable protector including a pair of bendable tabs for securing said cable protector to said side wall for separating said mounting screw from said interior of said box for preventing contact between said mounting screw and said cable.

2. An electrical outlet box assembly of claim 1 wherein said outlet box includes a bottom wall and an open upper end, said mounting tab extending inwardly from said side wall adjacent said open upper end.

3. An electrical outlet box assembly of claim 2 wherein said cable protector extends from adjacent said mounting tab to adjacent said bottom wall.

4. An electrical outlet box assembly of claim 2 wherein said cable protector is interiorly formed with said side wall and inward structure therefrom.

5. An electrical outlet box assembly of claim 2 wherein said cable protector is a separate element attachable to said outlet box.

6. An electrical outlet box assembly of claim 1 wherein said bendable tabs are located adjacent one end of said cable protector, said bendable tabs being secured to said side wall adjacent said open upper end.

7. An electrical outlet box assembly of claim 1 wherein said bendable tabs are located centrally along said cable protector and wherein said bendable tabs are insertable into slots formed in said side walls.

8. An electrical outlet box assembly of claim 1 wherein said cable protector is formed from said outlet box.

9. An electrical outlet box assembly of claim 1 wherein said protector is configured to accommodate a given screw configuration.

* * * * *